Figure 1:
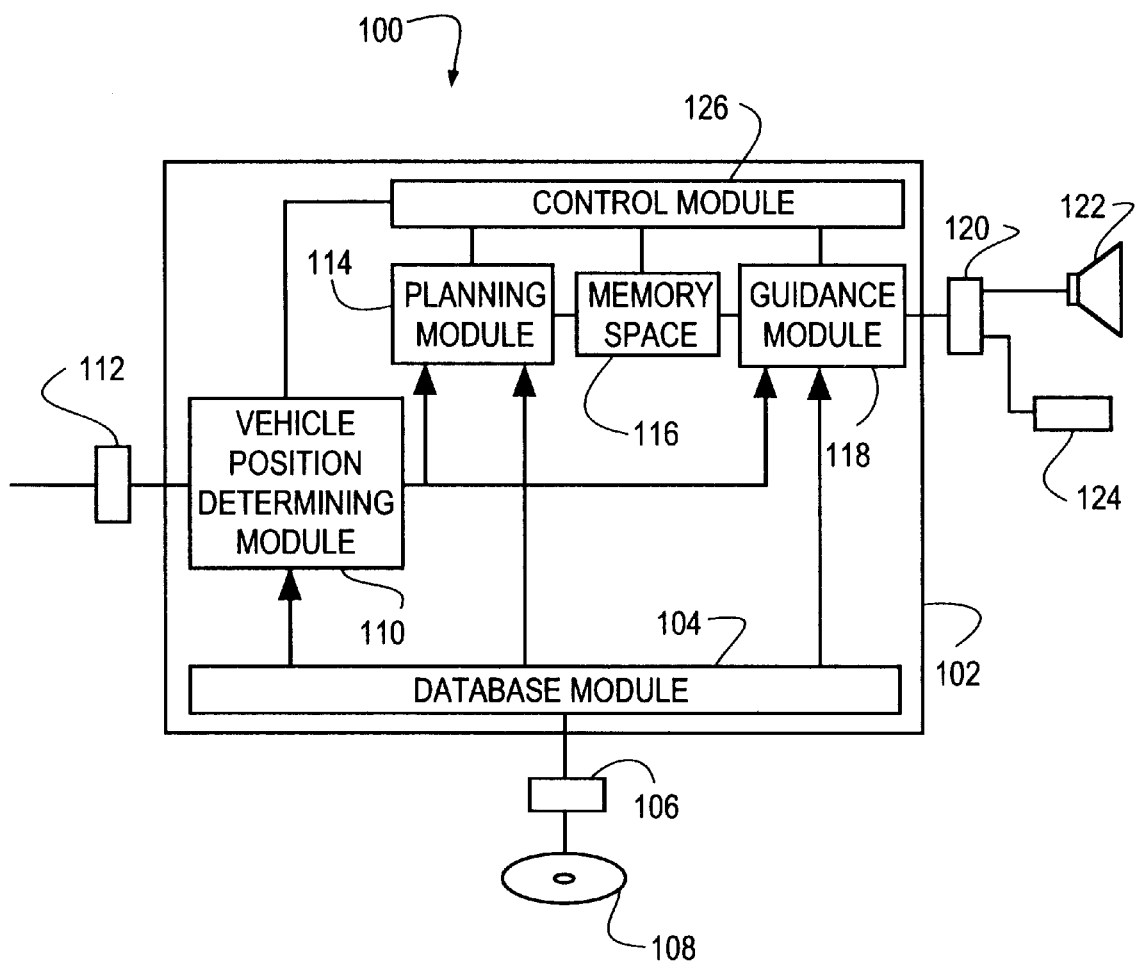

United States Patent
Völkel et al.

[19]

[11] Patent Number: 6,104,315
[45] Date of Patent: Aug. 15, 2000

[54] NAVIGATION SYSTEM FOR GUIDING A DRIVER

[75] Inventors: Andreas Völkel; Hans G. M. Hermans, both of Eindhoven, Netherlands

[73] Assignee: Mannesmann VDO AG, Frankfurt, Germany

[21] Appl. No.: 09/003,280

[22] Filed: Jan. 6, 1998

[30]     Foreign Application Priority Data

Jan. 10, 1997 [EP] European Pat. Off. ............. 96200066

[51] Int. Cl.⁷ .................................................. G08G 1/123
[52] U.S. Cl. ........................... 340/988; 340/990; 340/995
[58] Field of Search ................................... 340/988, 990, 340/995; 701/210, 201, 202, 205

[56]     References Cited

U.S. PATENT DOCUMENTS

| 5,043,902 | 8/1991 | Yokoyama et al. | 340/995 |
| 5,262,775 | 11/1993 | Tamai et al. | 340/988 |
| 5,291,414 | 3/1994 | Tamai et al. . | |
| 5,311,434 | 5/1994 | Tamai . | |
| 5,343,399 | 8/1994 | Yokoyama et al. | 340/990 |
| 5,436,840 | 7/1995 | Lam et al. | 340/988 |
| 5,559,511 | 9/1996 | Ito et al. | 340/988 |
| 5,652,706 | 7/1997 | Morimoto et al. | 340/988 |

FOREIGN PATENT DOCUMENTS 0580166   1/1994   European Pat. Off. .

OTHER PUBLICATIONS

Allan M. Kirson, A Compact Driver Interface for Navigation and Route Guidance, Jul. 30, 1995 IEEE Publication.

"Route Planning and Route Guidance in the Philips In–Car Navigation System Carin", Proc. of the 1st World Congress on Applications of Transport Telematics and Intelligent Vehicle–highway Systems, Paris, Dec. 1994, vol. 1, pp 240–248.

*Primary Examiner*—Jeffery A. Hofsass
*Assistant Examiner*—John Tweel, Jr.
*Attorney, Agent, or Firm*—Mayer, Brown & Platt

[57]     ABSTRACT

A navigation system (100) includes a vehicle position determining module (110) for determining the current position of the vehicle and a planning module (114) for planning a route between the current position and a desired destination. The navigation system (100) further includes a guidance module (118) for presenting guidance information to guide the driver along the planned route. The navigation system (100) is arranged to detect when the vehicle has left the planned route and to deactivate the guidance module (118) when the vehicle has left the planned route.

8 Claims, 2 Drawing Sheets

NAVIGATION SYSTEM FOR GUIDING A DRIVER

The invention relates to a navigation system for guiding a driver of a vehicle along a first route, the system comprising:
- a vehicle position determining module for determining a current position of the vehicle,
- a planning module for planning the first route between the current position and a destination,
- a guidance module for presenting the driver guidance information along the first route, and being arranged to detect when the vehicle has left the first route.

Such a system is known from the paper "Route planning and route guidance in the Philips in-car navigation system CARiN", Proceedings of the 1st world Congress on Applications of Transport Telematics and Intelligent Vehicle-Highway Systems, Paris, December. 1994, Volume 1, pages 240–248. The known system has a planning module that finds an optimal route from the current vehicle position to a desired destination, given a certain route characteristic. The desired destination and the route characteristic are specified by the driver. The specified destination can be a city, a street, a street crossing, a service or a facility. The route characteristic indicates the kind of route the driver prefers: fastest route, shortest route, as much as possible on motor-ways or as little as possible on motor-ways. The system has a guidance module that guides the driver along the planned route to the destination by means of guidance information. The guidance information is presented to the driver in an audible way, by spoken voice messages, and in a visible way, by displaying pictures on an LCD screen. The planned route is analyzed to select those junctions for which guidance information has to be presented. When the driver deviates from the planned route, a new route will immediately be planned and subsequently guidance information will be presented to guide the driver along this new route to the destination. The planning of the new route takes only little time and the driver will hardly notice the deviation from the original route because the guidance information for the new route is almost instantly presented after the deviation is presented to the driver. If the driver deviates at a certain location from the planned route in order to follow a personally preferred route, the guidance information that is subsequently presented by the known system will be based on repeatedly planned new routes trying to guide the driver to the destination along one of those routes.

It is an object of the invention to provide a navigation system of the kind set forth with an improved way of responding to a deviation from the planned route compared with the known navigation system. This object is achieved according to the invention in a navigation system that is characterized in that the navigation system is arranged to deactivate the guidance module when it detects that the vehicle has left the first route. By deactivating the guidance module if the driver deviates from the route, the system does not present guidance information to the driver that is of no relevance. Then the driver is no longer confronted with superfluous, potentially misleading and annoying, guidance information while following the deviating route. A further advantage is that the system automatically deactivates the guidance module and does not require the driver to take any action to switch off that part of the system.

An embodiment of the navigation system according to the invention is characterized in that the navigation system is arranged to activate, when it detects that the vehicle has left the first route, the planning module to plan a second route between the current position and the destination. By planning the second route the system has available a new route to the desired destination. When guidance is to be resumed, the system can present the guidance information directly without the need of first planning the new route.

An embodiment of the navigation system according to the invention is characterized in that the navigation system is arranged to reactivate the guidance module and that the guidance module is arranged to present the driver guidance information along the second route. Through reactivating the guidance module, the system presents guidance information to guide the driver along the new route to the destination.

An embodiment of the navigation system according to the invention is characterized in that the navigation system is arranged to reactivate the guidance module after a predetermined time interval following the deactivation. By reactivating the guidance module after a predetermined time interval has lapsed since the deviation from the original route, the system starts again presenting guidance information to follow the then current route to the destination. The advantage is that the driver can deviate from the original route to follow a deviating route for a predetermined time, after which guiding is resumed without requiring any action from the driver.

An embodiment of the navigation system according to the invention is characterized in that the navigation system is arranged to reactivate the guidance module after receipt of a reactivate command from the driver. In this way the driver is able to reactivate the guidance module in order to receive guidance information along the then current route to the destination. This is particularly useful if the deviating route has ended before the system automatically resumes giving guidance or if the deviation from the original route was accidental.

An embodiment of the navigation system according to the invention is characterized in that the navigation system is arranged to present a notification to the driver when the guidance module is deactivated. In this way, the driver is notified that system has deactivated the guidance module and that no guidance information will be presented.

Further advantageous embodiments of the invention are recited in the dependent claims.

The invention and its attendant advantages will be further elucidated with the aid of exemplary embodiments and the accompanying schematic drawings, whereby:

FIG. 1 schematically shows a navigation system according to the invention, and

Figure 2:
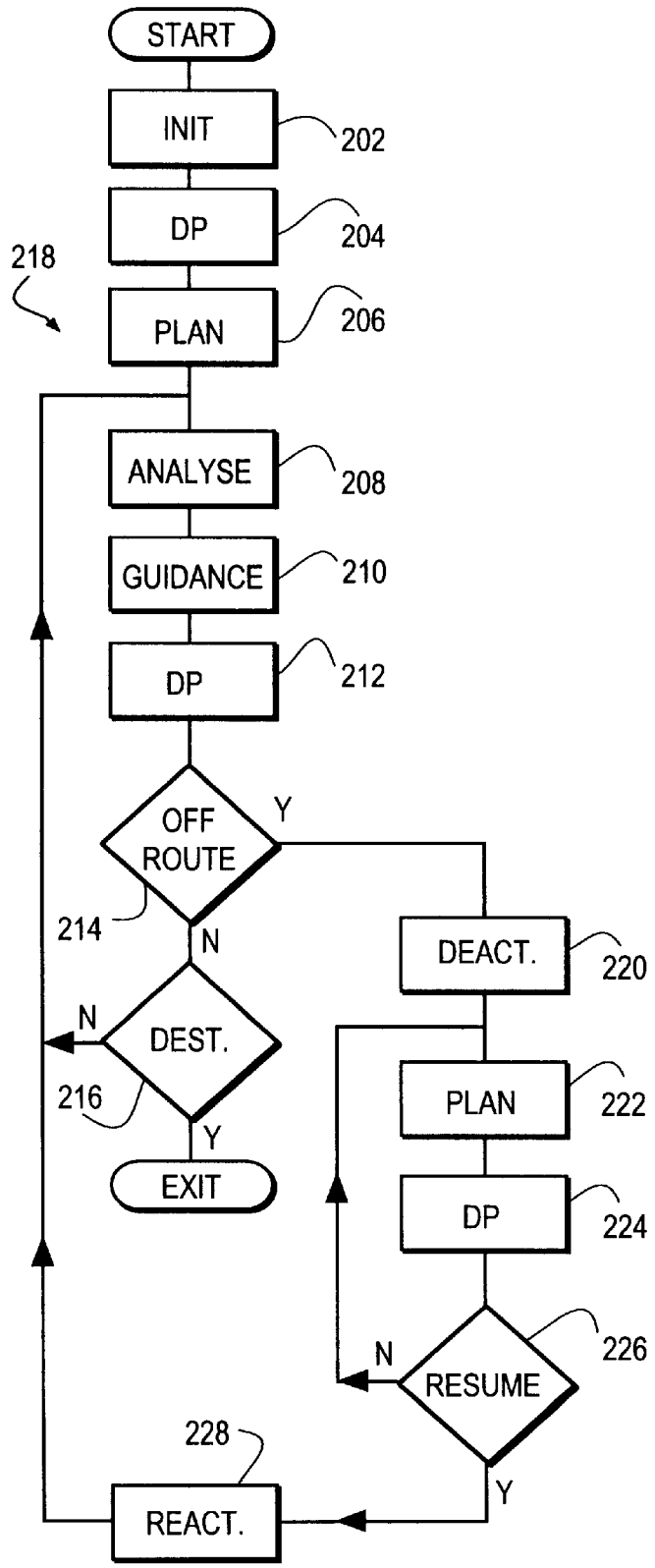

FIG. 2 schematically shows the presenting of guidance in an embodiment of the navigation system according to the invention.

Corresponding features in the various Figures are denoted by the same reference symbols.

FIG. 1 schematically shows a navigation system according to the invention. The system 100 comprises a central unit 102 including various modules for performing specific tasks. The central unit can be implemented on a computer comprising a central processor and working memory loaded with software programs for carrying out the specific tasks. The system 100 has a database module 104 for managing and providing information on roads. The system has reading means 106 to read information from a map database stored on a data carrier, like CD-ROM 108. Other types of carrier can also be used, e.g. magnetic disk and IC Card. The map database comprises information on roads of the area to which the particular map relates, e.g. all roads of a country or of a state. The system 100 further comprises a vehicle position determining module 110 for determining the current position of the vehicle. To this end, module 110 receives position information via an interface 112. This information can be supplied by a position determining system like a GPS receiver, using information broadcast by dedicated satellites. However, the position information can also be supplied in another way, for instance using one or more distance sensors, for measuring the distance travelled by the vehicle, and a compass or a gyro, for measuring the heading of the vehicle.

The system 100 further comprises a planning module 114 that is suitable to plan a route between the current position of the vehicle and a desired destination. The desired destination is entered into the system in a convenient way, e.g. by entering the post code via a keyboard, by entering road names, by entering co-ordinates or by pointing to a position on a map displayed by the system. The planning module 114 searches through the map database for a route that is optimal according to some characteristic. The characteristic can be the travel time, the travel distance, a combination of time and distance, or some other criterion that can be derived from information in the map database, like the preferred type of road. The resulting route is stored in memory space 116 and the driver of the vehicle is given guidance to follow this route. The system 100 has a guidance module 118 that presents guidance information to the driver of the vehicle, based on the planned route and the current position of the vehicle. The guidance information is presented via an interface 120 in an audible way via loudspeaker 122 and/or in a visible way via display screen 124. The system further includes a control module 126 that co-ordinates the operation of the various modules and interfaces with other modules not shown in the figure, e.g. with a user interface for entering the various commands and information like the desired destination.

FIG. 2 schematically shows the presenting of guidance in an embodiment of the navigation system according to the invention. The principal behaviour of the system for presenting guidance information is shown in the flow chart in a simplified way, for ease of illustrating the invention. Various steps can be executed in a different order than the one shown and many detailed steps are not shown in flow chart. Initialisation step 202 includes determining the desired destination and the characteristic to be optimised in route planning. In step 204 the current position of the vehicle is determined and in step 206 a route is planned between the current position and the destination. The planned route is analyzed in step 208 in order to determine the specific guidance information to be presented next to the driver and the moment at which this information should be given. In step 210 the specific guidance information is presented to the driver and in step 212 the current position of the vehicle is determined in order to follow the progress of the vehicle. In step 214 it is verified whether the vehicle is still on the planned route and if this is the case, then in step 216 it is verified whether the vehicle has reached the destination. If this is not the case, then the loop 218 with steps 208–216 is repeated again and if the vehicle has reached the destination, then a message indicating this situation is presented to the driver and this part of the system operation is finished. When at a certain moment it is detected in step 214 that the vehicle has left the planned route, then execution of the loop 218 is ended and the system continues with step 220. In step 220 the guidance module is deactivated in order to prevent subsequent presenting of guidance information to the driver. Then in step 222 a new route is planned between the current position of the vehicle and the destination and in step 224 the then current position of the vehicle is determined. In step 226 it is verified whether the presenting of guidance information to the driver should be resumed. There are various conditions which lead to the situation in which guidance should be resumed. This can be if a certain predetermined time interval since the deactivation of the guidance module has lapsed or if the vehicle has travelled a certain predetermined distance from the location where it left the original route. Furthermore guidance should be resumed if the driver has entered a command requesting the resumption. If the guidance should not yet be resumed, then the loop with steps 222–226 is executed again. When at a certain moment it is detected in step 226 that guidance should be resumed, the execution is continued with step 228 in which the guidance module is reactivated. Then loop 218 is entered for presenting guidance information and for following the vehicle along the route, most recently planned in step 222.

Because the guidance module is deactivated in step 220 after that it has been detected in step 214 that the vehicle has left the planned route, a driver is able to follow a deviating route without being presented unsolicited guidance information. This guidance information would include directions to the destination via a potentially newly planned route, while the driver wants to follow the deviating route. Such deviating route could be desired for instance when the vehicle is in an area where the driver is very familiar or when the driver knows there is a problem on the planned route not known to the system. In the embodiment shown in FIG. 2, the system continuously plans a new route in step 222 when the vehicle has left the originally planned route. This has the advantage that a new route from the current position to the destination is immediately available when the presentation of guidance information is resumed. As an alternative, the new route could be planned after the step 226 where it is established that guidance should be resumed. This saves the computational effort of frequently planning a new route but gives some delay for planning the new route after the establishment that guidance is to be resumed.

FIG. 2 shows the operation of an embodiment of the invention in a simplified way to illustrate the principle of the invention. Some of the processes, like the process determine position (DP), are executed continuously so that its output is immediately available when required by another part of the system. In such a case, a step in FIG. 2 the output rather then executing the process at that moment.

What is claimed is:

1. A navigation system for guiding a driver of a vehicle along a first route, the system comprising:

a vehicle position determining module for determining a current position of the vehicle, a planning module for planning the first route between the current position and a destination, a guidance module for presenting the driver guidance information along the first route, and being arranged to detect when the vehicle has left the first route, characterized in that the navigation system is arranged to deactivate the guidance module when it detects that the vehicle has left the first route;

and wherein the navigation system is arranged to activate, when it detects that the vehicle has left the first route, the planning module to plan a second route between the current position and the destination, and reactivates the guidance module the guidance module to present the driver guidance information along the second route after a predetermined time interval following the deactivation.

2. A navigation system according to claim 1, characterized in that the navigation system is arranged to reactivate the guidance module after the vehicle has traveled predetermined distance following the deactivation.

3. A navigation system according to claim 1, characterized in that the navigation system is arranged to reactivate the guidance module after receipt of a reactive command from the driver.

4. A navigation system according to claim 1, characterized in that the navigation system is arranged to present a notification to the driver when the guidance model is deactivated.

5. A navigation system for guiding a driver of a vehicle along a first route, the system comprising:
- a vehicle position determining module for determining a current position of the vehicle,
- a planning module for planning the first route between the current position and a destination,
- a guidance module for presenting the driver guidance information along the first route, and being arranged to detect when the vehicle has left the first route, characterized in that the navigation system is arranged to deactivate the guidance module when it detects that the vehicle has left the first route;
- and wherein the navigation system is arranged to activate, when it detects that the vehicle has left the first route, the planning module to plan a second route between the current position and the destination, and to reactivate the guidance module to present the driver guidance information along the second route after the vehicle has traveled a predetermined distance following the deactivation.

6. A navigation system according to claim 5, characterized in that the navigation system is arranged to reactivate the guidance module after receipt of a reactive command from the driver.

7. A navigation system according to claim 5, characterized in that the navigation system is arranged to present a notification to the driver when the guidance module is deactivated.

8. A navigation system for guiding a driver of a vehicle along a first route, the system comprising:
- a vehicle position determining module;
- a planning module which plans routes between the current position and a destination, the planning module planning the first route between the current position and a destination,
- a guidance module which presents the driver guidance information along the planned route,
- a control module coupled to the vehicle position module, planning module and guidance module, the control module detecting when the vehicle has left the first route, and deactivating the guidance module when it detects that the vehicle has left the first route, activating planning module to plan a second route between the current position and the destination, when it detects that the vehicle has left the first route, and reactivating the guidance module to present the driver guidance information along the second route after a predetermined time interval following the deactivation.

* * * * *